(12) United States Patent
Zager et al.

(10) Patent No.: US 9,777,970 B2
(45) Date of Patent: Oct. 3, 2017

(54) REDUCED THERMAL EXPANSION CLOSURE BARS FOR A HEAT EXCHANGER

(71) Applicant: Hamilton Sundstrand Corporation, Windsor Locks, CT (US)

(72) Inventors: Michael Zager, Windsor, CT (US); Donald E. Army, Enfield, CT (US); George Kan, West Hartford, CT (US); Charles J. McColgan, West Granby, CT (US); Nigel Palmer, West Granby, CT (US)

(73) Assignee: Hamilton Sundstrand Coporation, Charlotte, NC (US)

( * ) Notice: Subject to any disclaimer, the term of this patent is extended or adjusted under 35 U.S.C. 154(b) by 1035 days.

(21) Appl. No.: 13/963,435

(22) Filed: Aug. 9, 2013

(65) Prior Publication Data
US 2015/0041105 A1    Feb. 12, 2015

(51) Int. Cl.
| | |
|---|---|
| *F28F 3/10* | (2006.01) |
| *F28D 9/00* | (2006.01) |
| *F28F 1/10* | (2006.01) |
| *F28F 21/08* | (2006.01) |
| *F28D 1/03* | (2006.01) |
| *F16J 15/08* | (2006.01) |

(52) U.S. Cl.
CPC .............. *F28F 1/10* (2013.01); *F28D 1/0366* (2013.01); *F28D 9/0062* (2013.01);
(Continued)

(58) Field of Classification Search
CPC ...... F28F 3/10; F28F 2240/00; F28F 2265/26; F28D 9/0062; F16J 15/08; F16J 15/0806; F16J 15/0818
(Continued)

(56) References Cited

U.S. PATENT DOCUMENTS

| | | | | |
|---|---|---|---|---|
| 3,601,185 A | * | 8/1971 | Rothman | .............. F28D 9/0062 |
| | | | | 165/166 |
| 4,442,886 A | * | 4/1984 | Dinulescu | ............. F28D 9/0037 |
| | | | | 165/166 |

(Continued)

FOREIGN PATENT DOCUMENTS

| | | |
|---|---|---|
| DE | 2816720 A1 | 10/1978 |
| DE | 202011052186 U1 | 3/2013 |

(Continued)

OTHER PUBLICATIONS

The European Search Report mailed Oct. 2, 2014 for European Application No. 14171924.5.

*Primary Examiner* — Leonard R Leo
(74) *Attorney, Agent, or Firm* — Kinney & Lange, P.A.

(57) ABSTRACT

A plate fin heat exchanger is configured to receive hot flow from a hot source and cool flow from a cool source. The plate fin heat exchanger includes a plurality of plates arranged in parallel to define a plurality of flow passages there between, and a set of closure bars arranged at a first side of the plurality of plates to seal a first set of the flow passages against ingress of the hot flow, thereby directing the hot flow into a second set of the flow passages. Each respective closure bar includes an inner core formed of a first material having a first coefficient of thermal expansion and an outer cladding arranged about the inner core, the outer cladding formed of a second material having a second coefficient of thermal expansion. The first coefficient of thermal expansion is less than the second coefficient of thermal expansion.

17 Claims, 3 Drawing Sheets

(52) U.S. Cl.
 CPC .......... *F28D 9/0081* (2013.01); *F28F 21/089* (2013.01); *F16J 15/0806* (2013.01); *F28F 3/10* (2013.01); *F28F 2240/00* (2013.01); *F28F 2265/26* (2013.01)

(58) Field of Classification Search
 USPC .................... 165/166, 82; 277/645, 651–653
 See application file for complete search history.

(56) References Cited

U.S. PATENT DOCUMENTS

| | | | | |
|---|---|---|---|---|
| 5,192,623 | A * | 3/1993 | Gewelber | B23K 1/0014 228/181 |
| 6,059,025 | A * | 5/2000 | Hossfeld | F28F 9/001 165/166 |
| 8,276,654 | B2 * | 10/2012 | Zaffetti | F28D 9/0062 165/166 |
| 8,883,318 | B2 * | 11/2014 | Yamamoto | B23K 1/19 428/652 |
| 8,985,192 | B2 * | 3/2015 | Mitsuhashi | F28D 9/0062 165/166 |
| 2009/0288811 | A1 * | 11/2009 | Bolla | F28D 9/0062 165/166 |

FOREIGN PATENT DOCUMENTS

| | | | |
|---|---|---|---|
| FR | 2066982 | A1 | 8/1971 |
| GB | 2093581 | A | 9/1982 |
| GB | 2157995 | A | 11/1985 |
| WO | 0181849 | A1 | 11/2001 |

* cited by examiner

REDUCED THERMAL EXPANSION CLOSURE BARS FOR A HEAT EXCHANGER

BACKGROUND

The present disclosure relates to heat exchangers, and in particular to closure bars for plate fin heat exchangers.

Heat exchangers are often used to transfer heat between two fluids. For example, in aircraft environmental control systems, heat exchangers may be used to transfer heat between a relatively hot air source (e.g., bleed air from a gas turbine engine) and a relatively cool air source (e.g., ram air). Some heat exchangers, often referred to as plate fin heat exchangers, include a plate fin core having multiple heat transfer sheets arranged in layers to define air passages there between. Closure bars seal alternating inlets of hot air and cool air inlet sides of the core. Accordingly, hot air and cool air are directed through alternating passages to form alternating layers of hot and cool air within the core. Heat is transferred between the hot and cool air via the heat transfer sheets that separate the layers. In addition, to facilitate heat transfer between the layers, each of the passages can include heat transfer fins, often formed of corrugated material (e.g., aluminum), that are oriented in a direction of the flow within the passage. The heat transfer fins increase turbulence and a surface area that is exposed to the airflow, thereby enhancing heat transfer between the layers.

Typically, to further facilitate heat transfer within the core, components of a plate fin heat exchanger are formed of a material, such as aluminum, that has a relatively high heat transfer coefficient. However, as hot air passes over the closure bars (e.g., closure bars at the hot air inlet), a combination of a high velocity of hot air at the inlet and a relatively high coefficient of thermal expansion of aluminum can cause rapid physical expansion of the closure bars. Accordingly, because corners of the heat exchanger restrain overall expansion of the core, such rapid expansion of the closure bars can result in physical damage to components of the core (e.g., crushing of the heat transfer fins).

SUMMARY

In one example, a plate fin heat exchanger is configured to receive hot flow from a hot source and to receive cool flow from a cool source. The plate fin heat exchanger includes a plurality of plates arranged in parallel to define a plurality of flow passages there between. The plate fin heat exchanger further includes a first set of closure bars arranged at a first side of the plurality of plates to seal a first set of the plurality of flow passages against ingress of the hot flow, thereby directing the hot flow into a second set of the plurality of flow passages. Each respective closure bar of the set of closure bars includes an inner core formed of a first material having a first coefficient of thermal expansion, and an outer cladding arranged about the inner core. The outer cladding is formed of a second material having a second coefficient of thermal expansion. The first coefficient of thermal expansion is less than the second coefficient of thermal expansion.

In another example, a closure bar for a plate fin heat exchanger includes a first length defining a major axis of the closure bar extending from a first end of the closure bar to a second end of the closure bar, a first width defining a first minor axis of the closure bar extending from a first minor face of the closure bar to a second minor face of the closure bar, and a first thickness defining a second minor axis of the closure bar extending from a first major face of the closure bar to a second major face of the closure bar. The closure bar further includes an inner core formed of a first material having a first coefficient of thermal expansion. The inner core has a second length, less than the first length of the closure bar, extending from a first end of the inner core proximate the first end of the closure bar to a second end of the inner core proximate the second end of the closure bar. The closure bar further includes an outer cladding formed of a second material having a second coefficient of thermal expansion and arranged about the inner core to circumscribe the inner core about the major axis of the closure bar.

DETAILED DESCRIPTION

According to techniques of this disclosure, a closure bar of a plate fin heat exchanger includes an inner core formed from a material (e.g., titanium) that has a lower coefficient of thermal expansion than a cladding (e.g., aluminum) arranged about the core. The inner core lowers the overall thermal expansion properties of the closure bar. The outer cladding can enable the closure bar to be more easily attached (e.g., welded) to other components of the heat exchanger (e.g., the heat exchanger housing) that may be formed of a similar material. Accordingly, a closure bar disclosed herein can help to prevent resulting stress and physical damage to components of the plate fin core, such as heat transfer fins of the core, which can result from rapid thermal expansion of the closure bar. In this way, the disclosed closure bar can increase reliability and longevity of components of a plate fin heat exchanger.

Figure 1:
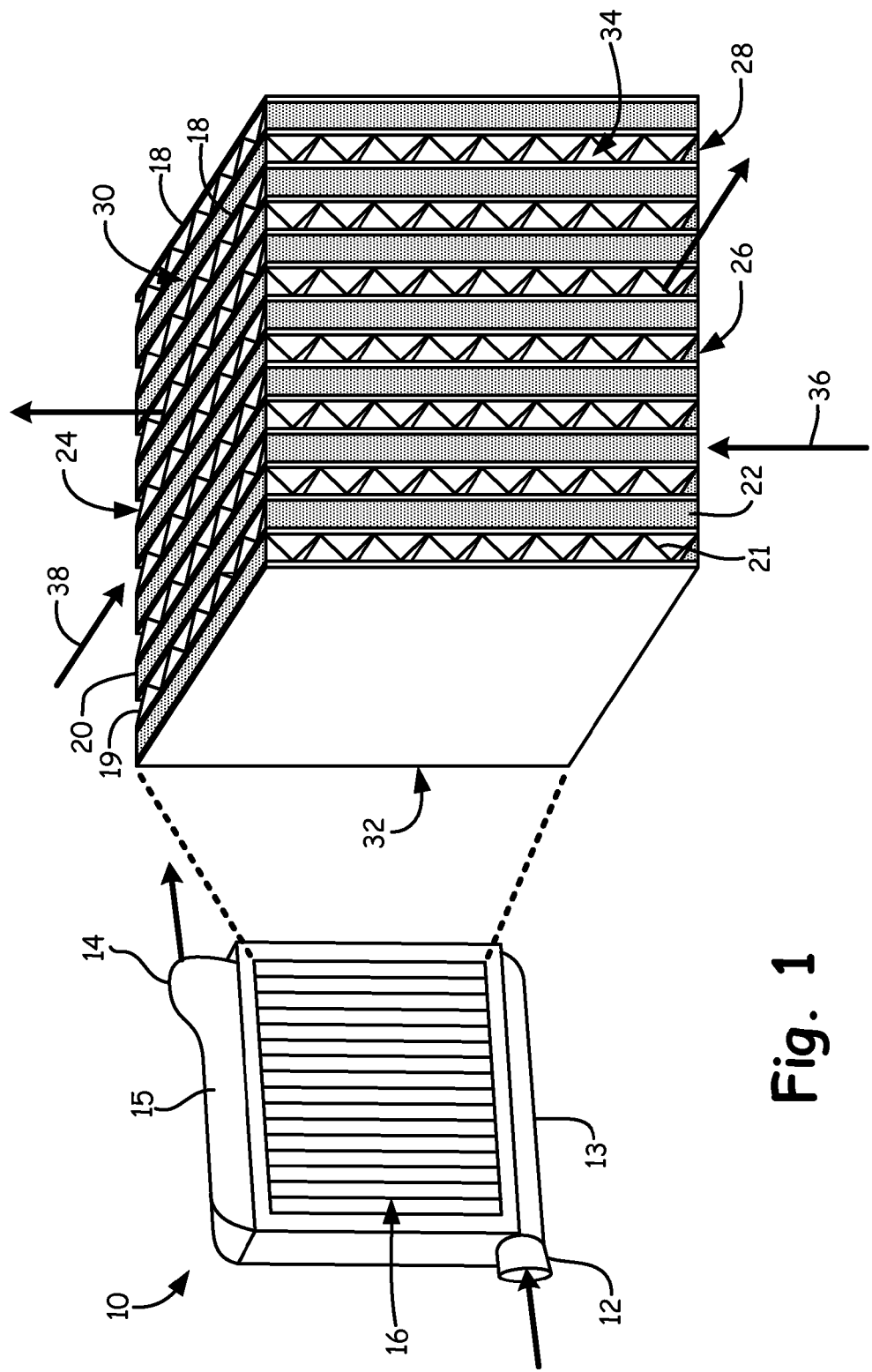
FIG. 1 is a schematic diagram of a plate fin heat exchanger.

FIG. 1 is a schematic diagram of plate fin heat exchanger 10, in accordance with one or more aspects of this disclosure. As illustrated, plate fin heat exchanger 10 includes hot air inlet 12, hot air inlet manifold 13, hot air outlet 14, hot air outlet manifold 15, and plate fin core 16. Plate fin core 16 includes heat transfer plates 18, cool air closure bars 20, and hot air closure bars 22. As illustrated, plate fin core 16 can further include a plurality of heat transfer structures disposed between heat transfer plates 18, such as hot air fins 19 and cool air fins 21.

Heat transfer plates 18 are arranged in parallel to define a plurality of flow passages there between. As illustrated, heat transfer plates 18 can be generally rectangular plates arranged in parallel layers to define flow passages (e.g., air flow passages) through gaps between the layers. As in the example of FIG. 1, heat transfer plates 18 can be arranged within plate fin core 16 to define a set of hot air flow passages 24 and a set of cool air flow passages 26. Heat transfer plates 18 can be formed of one or more materials having a relatively high heat transfer coefficient, such as aluminum, copper, silver, gold, or other materials, thereby facilitating efficient heat transfer between air flows through alternating layers. Hot air fins 19 and cool air fins 21 can be disposed within hot air flow passages 24 and cool air flow passages 26, respectively, and oriented in a direction of flow within a respective air flow passage, as is further described below.

Plate fin core 16 includes cladded cool air closure bars 20 disposed at hot air inlet side 28 and hot air outlet side 30 of plate fin core 16. As illustrated, cool air closure bars 20 (i.e., a set of cool air closure bars 20) are arranged at hot air outlet side 30 in close physical proximity to the set of cool air flow passages 26 (e.g., by welding, brazing, or other attachment techniques) to seal the set of cool air flow passages 26 against ingress of hot air at hot air outlet side 30. While illustrated as including cool air closure bars 20 arranged at hot air outlet side 30, it should be understood that plate fin core 16 includes similar cool air closure bars 20 disposed at hot air inlet side 28 opposite hot air outlet side 30. That is, each of cool air flow passages 26 is sealed against ingress of hot air at both hot air inlet side 28 and hot air outlet side 30 of plate fin core 16 by a set of cool air closure bars 20. In this way, cool air closure bars 20 are configured to seal cool air flow passages 26 (i.e., a set of alternating flow passages of plate fin core 16) against ingress of hot air, thereby directing hot air received from a hot air source (e.g., engine bleed air from a gas turbine engine) into hot air flow passages 24.

Plate fin core 16 further includes cladded hot air closure bars 22 disposed at cool air inlet side 32 and cool air outlet side 34 of plate fin core 16. As illustrated, hot air closure bars 22 are arranged at cool air outlet side 34 in close physical proximity to the set of hot air flow passages 24 (e.g., by welding, brazing, or other attachment techniques) to seal the set of hot air flow passages 24 against ingress of cool air at cool air outlet side 34. While illustrated as including hot air closure bars 22 arranged at cool air outlet side 34, it should be understood that plate fin core 16 includes similar hot air closure bars 22 disposed at cool air inlet side 32 opposite cool air outlet side 34. That is, each of hot air flow passages 24 is sealed against ingress of cool air at both cool air inlet side 32 and cool air outlet side 34 of plate fin core 16 by a set of hot air closure bars 22. In this way, hot air closure bars 22 are configured to seal hot air flow passages 24 (i.e., a set of alternating flow passages of plate fin core 16) against ingress of cool air, thereby directing cool air received from a cool air source (e.g., ram air) into cool air flow passages 26.

In some examples, as in the example of FIG. 1, each of hot air inlet side 28 and hot air outlet side 30 can be orthogonal to both of cool air inlet side 32 and cool air outlet side 34. In such examples, plate fin core 16 includes hot air flow passages 24 that define a flow direction of hot air that is orthogonal a direction of a cool air flow defined by cool air flow passages 26. In other examples, hot air inlet side 28 and hot air outlet side 30 need not be orthogonal to both of cool air inlet side 32 and cool air outlet side 34. In general, plate fin core 16 can include any configuration of hot air flow passages and cool air flow passages such that hot air and cool air are directed through plate fin core 16 in alternating layers of hot and cool air.

According to techniques disclosed herein, cool air closure bars 20 and/or hot air closure bars 22 include an inner core formed of a first material having a first coefficient of thermal expansion and an outer cladding arranged about the inner core. The outer cladding can be formed of a second material having a second coefficient of thermal expansion. The first coefficient of thermal expansion can be less than the second coefficient of thermal expansion, thereby reducing the overall thermal expansion properties of the closure bar.

As an example operation of plate fin heat exchanger 10, hot air is received by plate fin heat exchanger 10 via hot air inlet 12 from a hot air source, such as engine bleed air from a gas turbine engine. The hot air received via hot air inlet 12 is directed toward hot air inlet side 28 of plate fin core 16 by hot air inlet manifold 13. Cool air closure bars 20, arranged at hot air inlet side 28 of plate fin core 16, seal cool air flow passages 26 from ingress of the hot air, thereby directing the hot air into hot air flow passages 24 (i.e., an alternating set of air passages of plate fin core 16). Accordingly, hot air flows through hot air flow passages 24 of plate fin core 16 along hot air flow path 36. Hot air exiting hot air outlet side 30 is collected by hot air outlet manifold 15 and directed through hot air outlet 14. Cool air is received by plate fin heat exchanger 10 via a cool air inlet (not illustrated) from a cool air source, such as ram air accumulated from an aircraft. The cool air is directed toward cool air inlet side 32 of plate fin core 16 by, for example, a cool air manifold. Hot air closure bars 22 seal hot air flow passages 24 from ingress of the cool air, thereby directing the cool air into cool air flow passages 26 (i.e., an alternating set of passages of plate fin core 16 that is complementary to the set of hot air flow passages 24). As such, cool air flows through cool air flow passages 26 of plate fin core 16 along cool air flow path 38 and exits plate fin core 16 at cool air outlet side 34.

In operation, heat transfers between the alternating sets of hot air flow passages 24 and cool air flow passages 26 via heat transfer plates 18 that separate the layers. Hot air fins 19 disposed within hot air flow passages 24, and cool air flow fins 21 disposed within cool air flow passages 26 enhance heat transfer between the layers. Cool air closure bars 20 and/or hot air closure bars 22 include an inner core formed of a material (e.g., titanium) that has a lower coefficient of thermal expansion than a material that forms an outer cladding arranged about the core (e.g., aluminum), as is further described below. Accordingly, the inner core lowers the overall thermal expansion properties of cool air closure bars 20 and/or hot air closure bars 22, thereby decreasing a rate and/or amount of physical thermal expansion of cool air closure bars 20 and/or hot air closure bars 22. In this way, cool air closure bars 20 and/or hot air closure bars 22 can reduce physical stress on components of plate fin heat exchanger 10 and/or damage to the components (e.g., crushing of heat transfer fins disposed between heat transfer plates 18) that can result from rapid expansion of cool air closure bars 20 and/or hot air closure bars 22.

Figure 2:
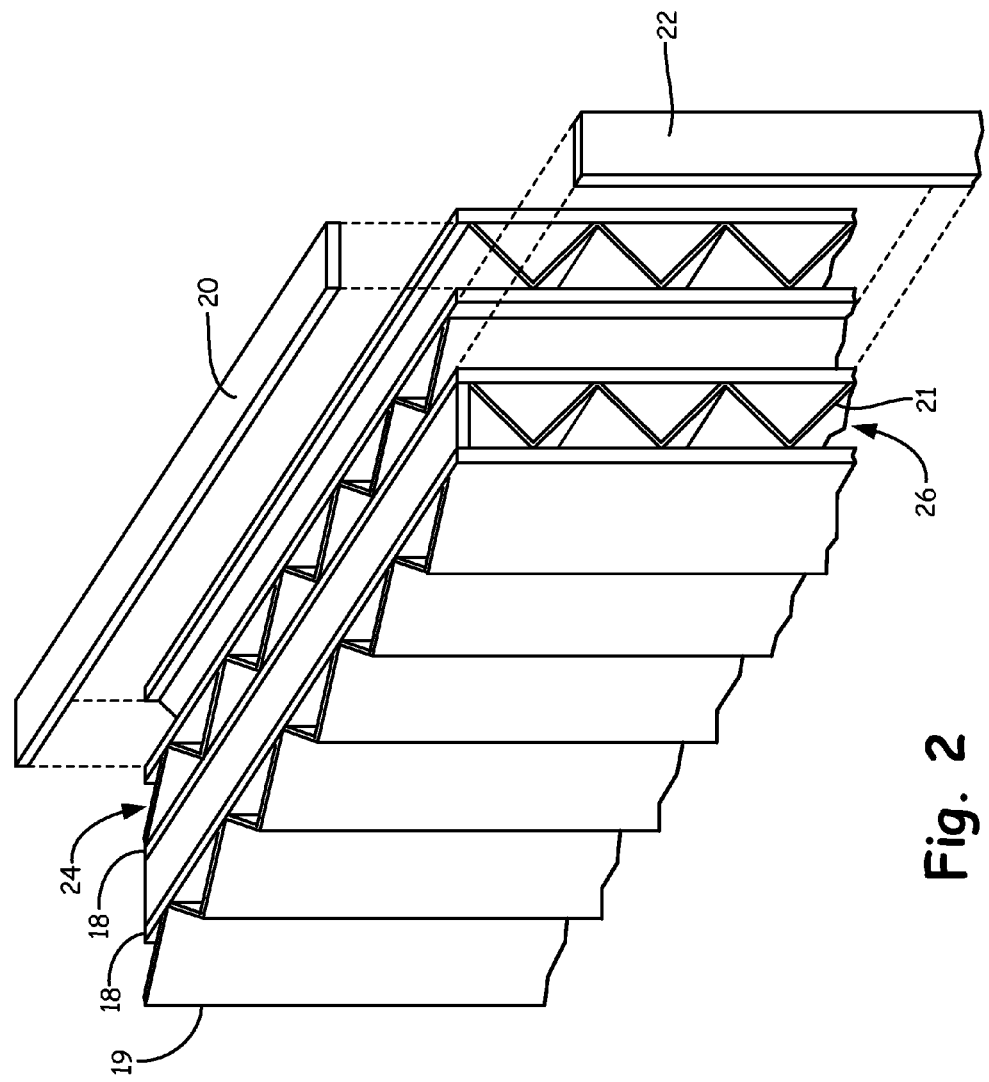
FIG. 2 is an exploded view of a portion of the core of the plate fin heat exchanger of FIG. 1.

FIG. 2 is an exploded view of a portion of plate fin core 16 of FIG. 1. As illustrated in FIG. 2, plate fin core 16 includes heat transfer plates 18, cool air closure bars 20, and hot air closure bars 22. As further illustrated, plate fin core 16 can include hot air flow fins 19 and cool air flow fins 21 disposed between heat transfer plates 18. Heat transfer plates 18 are arranged in parallel to define a plurality of air passages there between, such as hot air flow passages 24 and cool air flow passages 26. Cool air closure bars 20 are configured to be mounted (e.g., welded, brazed, and the like) adjacent cool air flow passages 26 at the hot air inlet side and hot air outlet side of plate fin core 16 to seal cool air flow passages 26 from ingress of hot air, thereby directing hot air received from a hot air source through hot air flow passages 24. Hot air closure bars 22 are configured to be mounted (e.g., welded, brazed, and the like) adjacent hot air flow passages 24 at the cool air inlet side and cool air outlet side of plate fin core 16 to seal hot air flow passages 24 from ingress of cool air, thereby directing cool air received from a cool air source through cool air flow passages 26. While the example illustration of FIG. 2 includes one cool air closure bar 20 and one hot air closure bar 22, it should be understood that plate fin core 16 can include multiple such cool air closure bars 20 and hot air closure bars 22. For instance, as illustrated in FIG. 1, plate fin core 16 can include multiple cool air closure bars 20 disposed at alternating air flow passages of both a hot air inlet side (e.g., hot air inlet side 28 of FIG. 1) and a hot air outlet side (e.g., hot air outlet side 30 of FIG. 1) of plate fin core 16. Similarly, plate fin core 16 can include multiple hot air closure bars 22 disposed at alternating flow passages of both a cool air inlet side (e.g., cool air inlet side 32 of FIG. 1) and a cool air outlet side (e.g., cool air outlet side 34 of FIG. 1) of plate fin core 16.

As illustrated, hot air flow fins 19 and cool air flow fins 21 can each be formed of a corrugated sheet of material and oriented in a direction of flow within a respective air flow passage. For instance, hot air flow fins 19 can be oriented within hot air flow passages 24 such that folds in the corrugation are oriented in a direction of hot air flow through hot air flow passages 24. Cool air flow fins 21 can be oriented within cool air flow passages 26 such that folds in the corrugation are orientated in a direction of cool air flow through cool air flow passages 26.

As further described below, cool air closure bars 20 and/or hot air closure bars 22 can include an inner core formed of a first material (e.g., titanium) that has a lower coefficient of thermal expansion than a material that forms a cladding (e.g., aluminum) arranged about the inner core. The inner core can reduce the rate and/or amount of thermal expansion (e.g., volumetric and/or linear expansion) of cool air closure bars 20 and/or hot air closure bars 22 when subjected to hot air flow, thereby reducing stress and/or damage to components of plate fin core 16 resulting from such expansion of the closure bars (e.g., crushing of hot air flow fins 19 and/or cool air flow fins 21).

Figure 3:
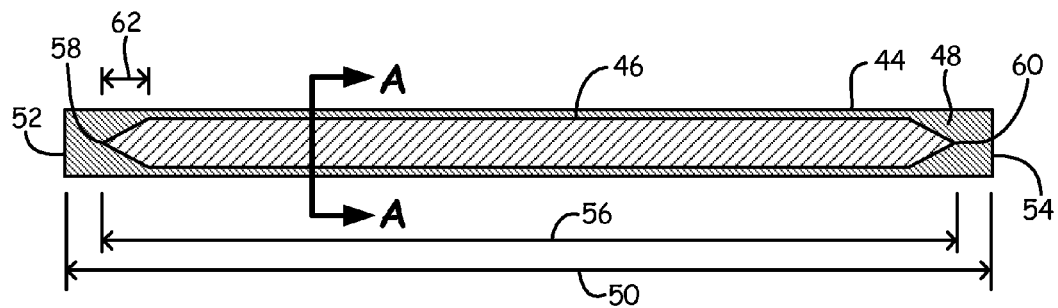
FIG. 3 is a side view of a closure bar.

FIG. 3 is a side view of a closure bar for a plate fin heat exchanger, in accordance with one or more aspects of this disclosure. As illustrated in FIG. 3, closure bar 44 includes inner core 46 and outer cladding 48. Inner core 46 can be formed of a first material having a first coefficient of thermal expansion. Examples of the first material of the inner core can include titanium, nickel, platinum, or other materials. Outer cladding 48 can be formed of a second material, different than the first material of inner core 46. Examples of the second material of the outer cladding can include aluminum, stainless steel, or other materials. The second material can have a second coefficient of thermal expansion. The first coefficient of thermal expansion of inner core 46 can be less than the second coefficient of thermal expansion of outer cladding 48. In certain examples, the second material that forms outer cladding 48 can be the same material as a material that forms a housing of the plate fin core. In some examples, the second material that forms outer cladding 48 can be a material that has a melting point that is within a threshold temperature range of a melting point of the material that forms a housing of the plate fin core (e.g., ten degrees Celsius, twenty degrees Celsius, fifty degrees Celsius, or other threshold amounts), thereby enabling attachment of closure bar 44 via attachment techniques such as welding, brazing, or other such techniques. In general, inner core 46 can be formed of any material that has a lower coefficient of thermal expansion than the material that forms outer cladding 48. In this way, inner core 46 can lower the overall thermal expansion properties of closure bar 44, thereby reducing the volumetric and/or linear physical thermal expansion of closure bar 44 when closure bar 44 is subjected to hot flow.

As illustrated in FIG. 3, closure bar 44 has closure bar length 50 extending from first closure bar end 52 to second closure bar end 54 and defining a major axis (i.e., an axis having greatest length) of closure bar 44. Inner core 46 has inner core length 56 extending from first inner core end 58, proximate first closure bar end 52, to second inner core end 60, proximate second closure bar end 54. As illustrated, inner core length 56 can be less than closure bar length 50, such that outer cladding 48 is arranged about inner core 46 and circumscribes inner core 46 along the major axis from first closure bar end 52 to second closure bar end 54.

In some examples, inner core 46 can taper from a maximum width toward at least one of first inner core end 58 and second inner core end 60. For example, as illustrated in FIG. 3, inner core 46 can taper along taper length 62 to a point. In other examples, inner core 46 can taper from a maximum width to a non-zero minimum width. The taper from the maximum width toward at least one of first inner core end 58 and second inner core end 60 can help to smooth a transition of thermal expansion properties of closure bar 44, such that reduced thermal expansion properties of closure bar 44 provided by inner core 46 do not abruptly change within closure bar 44.

Figure 4:
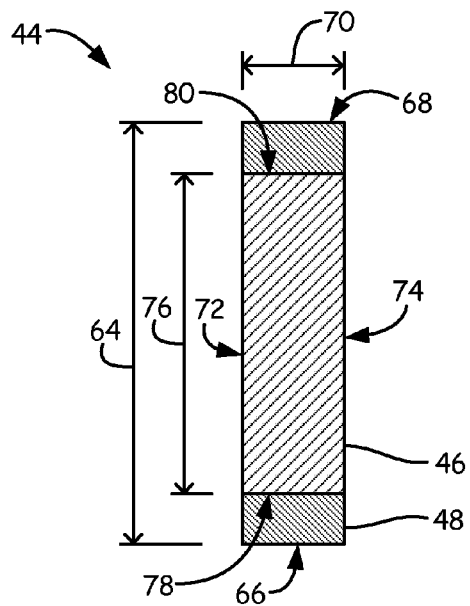
FIG. 4 is a cross-sectional view along section A-A of FIG. 3.

FIG. 4 is a cross-sectional view along section A-A of FIG. 3. As illustrated in FIG. 4, closure bar 44 includes inner core 46 and outer cladding 48. Closure bar 44 has closure bar width 64 extending from first closure bar minor face 66 to second closure bar minor face 68 (i.e., minor faces having less area than an area of a major face of closure bar 44) and defining a first minor axis of closure bar 44 (i.e., an axis having less than the greatest length of the axes of closure bar 44). Closure bar 44 has thickness 70 extending from first closure bar major face 72 to second closure bar major face 74 and defining a second minor axis of the closure bar. Inner core 46 has inner core width 76 extending from first inner core minor face 78 to second inner core minor face 80.

In some examples, such as the illustrated example of FIG. 4, inner core width 76 can be greater than half of closure bar width 64, such that inner core 46 forms greater than half of a width and/or volume of closure bar 44. In other examples, inner core width 76 can be less than half of closure bar width 64. In certain examples, as illustrated in FIG. 4, a thickness of inner core 46 can extend from first closure bar major face 72 to second closure bar major face 74, such that a thickness of inner core 46 is the same as (e.g., equal to) thickness 70 of closure bar 44. In this way, outer cladding 48 can be arranged about inner core 46 to circumscribe inner core 46 along a major axis of closure bar 44 (e.g., a length of closure bar 44) and not to circumscribe inner core 46 about the major faces of closure bar 44. In other examples, outer cladding 48 can be arranged about inner core 46 to surround inner core 46 about each of the faces of inner core 46, thereby enclosing inner core 46 within outer cladding 48 (not illustrated).

The following are non-exclusive descriptions of embodiments of the present disclosure.

A plate fin heat exchanger is configured to receive hot flow from a hot source and to receive cool flow from a cool source. The plate fin heat exchanger includes a plurality of plates arranged in parallel to define a plurality of flow passages there between. The plate fin heat exchanger further includes a first set of closure bars arranged at a first side of the plurality of plates to seal a first set of the plurality of flow passages against ingress of the hot flow, thereby directing the hot flow into a second set of the plurality of flow passages. Each respective closure bar of the first set of closure bars includes an inner core formed of a first material having a first coefficient of thermal expansion, and an outer cladding arranged about the inner core. The outer cladding is formed of a second material having a second coefficient of thermal expansion. The first coefficient of thermal expansion is less than the second coefficient of thermal expansion.

The plate fin heat exchanger of the preceding paragraph can optionally include, additionally and/or alternatively, any one or more of the following features, configurations, and/or additional components:

The plate fin heat exchanger may further include a second set of closure bars arranged at a second side of the plurality of plates to seal the second set of the plurality of flow passages against ingress of the cool flow, thereby directing the cool flow into the first set of the plurality of flow passages.

Each respective closure bar of the second set of closure bars may comprise an inner core formed of the first material having the first coefficient of thermal expansion and an outer cladding arranged about the inner core, the outer cladding formed of the second material having the second coefficient of thermal expansion.

The first set of the plurality of flow passages and the second set of the plurality of flow passages may comprise alternating sets of the plurality of flow passages.

The plate fin heat exchanger may further include a plurality of heat transfer structures disposed between each of the plurality of plates and within each of the plurality of defined flow passages. Each of the plurality of heat transfer structures may be oriented in a flow direction of the respective flow passage.

Each of the plurality of heat transfer structures may comprise a plurality of heat transfer fins.

Each of the plurality of heat transfer fins may be formed of a corrugated sheet of the second material.

The first side of the plurality of plates may be orthogonal to the second side of the plurality of plates.

The first material may comprise titanium.

The second material may comprise aluminum.

A maximum width of the inner core of each respective closure bar of the first set of closure bars may be greater than half of a width of the respective closure bar.

The inner core of each respective closure bar of the first set of closure bars may taper from a maximum width of the inner core toward at least one of a first and second end of the inner core.

A length of each respective closure bar of the first set of closure bars may be greater than a length of the inner core of the respective closure bar.

A thickness of the outer cladding of each respective closure bar of the first set of closure bars may be equal to a thickness of the inner core of the respective closure bar.

The plate fin heat exchanger may further include an outer housing that encloses the plurality of plates. The outer housing may be formed of the second material.

A closure bar for a plate fin heat exchanger includes a first length defining a major axis of the closure bar extending from a first end of the closure bar to a second end of the closure bar, a first width defining a first minor axis of the closure bar extending from a first minor face of the closure bar to a second minor face of the closure bar, and a first thickness defining a second minor axis of the closure bar extending from a first major face of the closure bar to a second major face of the closure bar. The closure bar further includes an inner core formed of a first material having a first coefficient of thermal expansion. The inner core has a second length, less than the first length of the closure bar, extending from a first end of the inner core proximate the first end of the closure bar to a second end of the inner core proximate the second end of the closure bar. The closure bar further includes an outer cladding formed of a second material having a second coefficient of thermal expansion and arranged about the inner core to circumscribe the inner core about the major axis of the closure bar.

The closure bar for the plate fin heat exchanger of the preceding paragraph can optionally include, additionally and/or alternatively, any one or more of the following features, configurations, and/or additional components:

The first material may comprise titanium. The second material may comprise aluminum.

The inner core may have a second thickness equal to the first thickness of the closure bar and extending from the first major face of the closure bar to the second major face of the closure bar along the second minor axis of the closure bar.

A maximum width of the inner core extending along the first minor axis of the closure bar may be greater than half of the first width of the closure bar.

The inner core may taper from a maximum width of the inner core toward each of the first and second ends of the closure bar.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plate fin heat exchanger configured to receive hot flow from a hot source and to receive cool flow from a cool source, the plate fin heat exchanger comprising:
   a plurality of plates arranged in parallel to define a plurality of flow passages there between; and
   a first set of closure bars arranged at a first side of the plurality of plates to seal a first set of the plurality of flow passages against ingress of the hot flow, thereby directing the hot flow into a second set of the plurality of flow passages,
   wherein each respective closure bar of the first set of closure bars comprises:
      an inner core formed of a first material having a first coefficient of thermal expansion; and
      an outer cladding arranged about the inner core, the outer cladding formed of a second material having a second coefficient of thermal expansion, wherein the first coefficient of thermal expansion is less than the second coefficient of thermal expansion, wherein a maximum width of the inner core is greater than half of a width of the respective closure bar, and wherein a thickness of the outer cladding is equal to a thickness of the inner core.

2. The plate fin heat exchanger of claim 1, further comprising:
   a second set of closure bars arranged at a second side of the plurality of plates to seal the second set of the plurality of flow passages against ingress of the cool flow, thereby directing the cool flow into the first set of the plurality of flow passages.

3. The plate fin heat exchanger of claim 2,
   wherein each respective closure bar of the second set of closure bars comprises:
      an inner core formed of the first material having the first coefficient of thermal expansion; and an outer cladding arranged about the inner core, the outer cladding formed of the second material having the second coefficient of thermal expansion.

4. The plate fin heat exchanger of claim 2, wherein the first set of the plurality of flow passages and the second set of the plurality of flow passages comprise alternating sets of the plurality of flow passages.

5. The plate fin heat exchanger of claim 2, further comprising a plurality of heat transfer structures disposed between each of the plurality of plates and within each of the plurality of defined flow passages, wherein each of the plurality of heat transfer structures is oriented in a flow direction of the respective flow passage.

6. The plate fin heat exchanger of claim 5, wherein each of the plurality of heat transfer structures comprises a plurality of heat transfer fins.

7. The plate fine heat exchanger of claim 6, wherein each of the plurality of heat transfer fins is formed of a corrugated sheet of the second material.

8. The plate fin heat exchanger of claim 2, wherein the first side of the plurality of plates is orthogonal to the second side of the plurality of plates.

9. The plate fin heat exchanger of claim 1, wherein the first material comprises titanium.

10. The plate fin heat exchanger of claim 1, wherein the second material comprises aluminum.

11. The plate fin heat exchanger of claim 1, wherein a length of each respective closure bar of the first set of closure bars is greater than a length of the inner core of the respective closure bar.

12. The plate fin heat exchanger of claim 1, further comprising an outer housing that encloses the plurality of plates, wherein the outer housing is formed of the second material.

13. A plate fin heat exchanger configured to receive hot flow from a hot source and to receive cool flow from a cool source, the plate fin heat exchanger comprising:
a plurality of plates arranged in parallel to define a plurality of flow passages there between; and
a first set of closure bars arranged at a first side of the plurality of plates to seal a first set of the plurality of flow passages against ingress of the hot flow, thereby directing the hot flow into a second set of the plurality of flow passages,
wherein each respective closure bar of the first set of closure bars comprises:
an inner core formed of a first material having a first coefficient of thermal expansion, the inner core tapering from a maximum width of the inner core toward at least one of a first and second end of the inner core; and
an outer cladding arranged about the inner core, the outer cladding formed of a second material having a second coefficient of thermal expansion, wherein the first coefficient of thermal expansion is less than the second coefficient of thermal expansion.

14. The plate fin heat exchanger of claim 13, wherein a length of each respective closure bar of the first set of closure bars is greater than a length of the inner core of the respective closure bar.

15. The plate fin heat exchanger of claim 13, wherein a thickness of the outer cladding of each respective closure bar of the first set of closure bars is equal to a thickness of the inner core of the respective closure bar.

16. A plate fin heat exchanger configured to receive hot flow from a hot source and to receive cool flow from a cool source, the plate fin heat exchanger comprising:
a plurality of plates arranged in parallel to define a plurality of flow passages there between; and
a first set of closure bars arranged at a first side of the plurality of plates to seal a first set of the plurality of flow passages against ingress of the hot flow, thereby directing the hot flow into a second set of the plurality of flow passages,
wherein each respective closure bar of the first set of closure bars comprises:
an inner core formed of a first material having a first coefficient of thermal expansion; and
an outer cladding arranged about the inner core, the outer cladding formed of a second material having a second coefficient of thermal expansion, wherein the first coefficient of thermal expansion is less than the second coefficient of thermal expansion, wherein a length of the respective closure bar is greater than a length of the inner core, and wherein a thickness of the outer cladding is equal to a thickness of the inner core.

17. The plate fin heat exchanger of claim 16, further comprising:
an outer housing that encloses the plurality of plates, wherein the outer housing is formed of the second material.

* * * * *